United States Patent
Takahashi et al.

(10) Patent No.: US 6,659,121 B1
(45) Date of Patent: Dec. 9, 2003

(54) SOLENOID AND HYDRAULIC CONTROL VALVE

(75) Inventors: Tamami Takahashi, Tokyo (JP); Chishiro Yamashina, Kanagawa (JP)

(73) Assignee: Ebara Corporation, Tokyo (JP)

(*) Notice: Subject to any disclaimer, the term of this patent is extended or adjusted under 35 U.S.C. 154(b) by 1 day.

(21) Appl. No.: 10/069,998

(22) PCT Filed: Aug. 29, 2000

(86) PCT No.: PCT/JP00/05821
§ 371 (c)(1),
(2), (4) Date: Mar. 1, 2002

(87) PCT Pub. No.: WO01/18438
PCT Pub. Date: Mar. 15, 2001

(30) Foreign Application Priority Data

Sep. 2, 1999 (JP) ............................................. 11-248845

(51) Int. Cl.$^7$ .......................... F15B 13/044; F16K 31/06
(52) U.S. Cl. .................. 137/238; 137/546; 137/625.65; 251/129.15
(58) Field of Search ................................ 137/238, 546, 137/625.65; 251/129.15

(56) References Cited

FOREIGN PATENT DOCUMENTS

| JP | 58-166184 | 10/1983 |
| JP | 1-152175 | 10/1989 |
| JP | 3-39664 | 8/1991 |
| JP | 5-65748 | 9/1993 |

*Primary Examiner*—Gerald A. Michalsky
(74) *Attorney, Agent, or Firm*—Wenderoth, Lind & Ponack, L.L.P.

(57) ABSTRACT

A solenoid has a cylindrical excitation coil and a plunger movable in the excitation coil and generates electromagnetic force to move the plunger when an electric current is supplied to the excitation coil. A cover for closing a side of a plunger compartment accommodating the plunger is provided with upper and lower through-holes communicatively extending through the cover from the outside of the solenoid to the plunger compartment. The uppermost part of the upper through-hole is above or level with the uppermost part of the plunger compartment. The lowermost part of the lower through-hole is below or level with the lowermost part of the plunger compartment.

1 Claim, 4 Drawing Sheets

SOLENOID AND HYDRAULIC CONTROL VALVE

TECHNICAL FIELD

The present invention relates to a proportional solenoid for driving a spool of a hydraulic control valve and also pertains to a hydraulic control valve using the solenoid.

BACKGROUND ART

Prior Art

FIG. 1 is a sectional view showing a structural example of a conventional solenoid of the type described above. The solenoid is a proportional solenoid that generates electromagnetic force proportional to the electric current supplied to an excitation coil. The solenoid 100 has a cylindrical casing 101. An axially movable plunger 102 is placed in the casing 101, together with an excitation coil 104 wound around a bobbin 103. The excitation coil 104 is disposed to surround the outer periphery of the plunger 102. The sides of the casing 101 are covered with covers 105 and 106.

A push pin 107 projects through the center of the cover 106 to transmit force generated from the plunger 102 and the displacement thereof to the outside of the solenoid 100. The cover 106 has a disk-shaped cover portion 106a made of a magnetic material and a cylindrical portion 106b projecting from the cover portion 106a in such a manner as to surround a part of the outer periphery of the plunger 102. The cylindrical portion 106b has a tapered portion at the distal end thereof. The tapered portion is engaged with a tapered portion of a non-magnetic cylindrical member 108. A magnetic cylindrical member 109 is engaged with an end of the non-magnetic cylindrical member 108 on the side thereof remote from the cover 106. The cylindrical portion 106b of the cover 106, together with the non-magnetic cylindrical member 108 and the magnetic cylindrical member 109, surrounds the plunger 102.

The tapered portion of the cylindrical portion 106b and the tapered portion of the non-magnetic cylindrical member 108 allow a part of the axial magnetic flux produced from the excitation coil 104 to escape to the outer peripheral side, whereby the axial attraction force acting on the plunger 102 is kept constant independently of the position of the plunger. The cover 106 is provided with a through-hole 111 communicating with a compartment 110 accommodating the plunger 102. The through-hole 111 is a hole for allowing fluid to come in and out of the compartment 110 therethrough in an amount corresponding to a change in the volume of fluid in the compartment 110 due to displacement of the plunger 102.

In FIG. 1, if the plunger 102 moves rightward from the solid-line position by dx to the broken-line position, an amount of fluid corresponding to $A_{PL}dx$ flows in the space at the left-hand side of the plunger 102 from the right-hand space. Meanwhile, an amount of fluid corresponding to $(A_{PL}-A_{PIN})dx$ is discharged from the right-hand space. An amount of fluid corresponding to the volume difference $A_{PIN}dx$ is sucked into the solenoid 100 through the through-hole 111 from the outside of the solenoid 100. Here, $A_{PL}$ denotes the sectional area of the plunger, and $A_{PIN}$ denotes the sectional area of the push pin 107.

In the above-described conventional solenoid 100, the through-hole 111 formed in the cover 106 is at a position below the top of the cylindrical compartment 110 accommodating the plunger 102. Therefore, an air reservoir 112 is undesirably formed in the compartment 110. That is, in FIG. 1, the distance Dh from the axis of the plunger 102 to the uppermost part of the through-hole 111 is smaller than the distance Di from the axis of the plunger 102 to the uppermost part of the compartment 110. Consequently, the conventional solenoid 100 has a structure in which air stays in the upper part of the compartment 110 without being exhausted therefrom (i.e. the air reservoir 112 is formed).

In a case where the air reservoir 112 is not present, when the plunger 102 moves rightward in the figure, for example, the fluid at the right-hand side of the plunger 102 flows leftward, and at this time, a moderate damping action is applied to the plunger 102 by the viscosity of the fluid flowing from the right to the left. However, if there is air in the compartment 110, because the viscosity of the air is extremely smaller than that of a liquid used as a working fluid, the damping action applied to the plunger 102 is reduced, and hence vibrations occur unfavorably.

If the air reservoir 112 is present in the solenoid 100 as used in a hydraulic control valve having a damping orifice (described later), a change in the volume of the solenoid-side space due to the displacement of the spool is undesirably absorbed by the compressibility of the air. Consequently, the damping effect cannot be obtained, and hence the spool vibrates unfavorably. Accordingly, the operation of the hydraulic control valve cannot be stabilized.

Further, when water is used as a working fluid, if there is air in the compartment 110, the air oxidizes the plunger 102 and the surrounding members. This causes friction to increase and degrades performance unfavorably.

DISCLOSURE OF THE INVENTION

Problem to be Solved by the Invention

The present invention was made in view of the above-described circumstances. An object of the present invention is to provide a solenoid wherein air cannot be collected in the space inside the solenoid, and hence the plunger or the spool operates stably without vibrating, and there is no possibility of an increase in friction or performance degradation which would otherwise be caused by oxidation of the plunger and the surrounding members, and also provide a hydraulic control valve using the solenoid.

Means for Solving the Problem

To solve the above-described problem, a first feature of the present invention resides in a solenoid having a cylindrical excitation coil and a plunger movable in the excitation coil and adapted to generate electromagnetic force to move the plunger when an electric current is supplied to the excitation coil. A cover for closing a side of a plunger compartment accommodating the plunger is provided with upper and lower through-holes extending through the cover from the outside of the solenoid to the plunger compartment. The uppermost part of the upper through-hole is above or level with the uppermost part of the plunger compartment. The lowermost part of the lower through-hole is below or level with the lowermost part of the plunger compartment.

A second feature of the present invention resides in a hydraulic control valve including a hydraulic control valve body having a spool sliding in a sleeve, and a solenoid having a plunger and an excitation coil for generating magnetic force to move the plunger. The solenoid is attached to the hydraulic control valve body to apply moving force to the spool by the movement of the plunger. A cover for a side of the solenoid at which the solenoid is attached to the hydraulic control valve body is provided with upper and lower through-holes communicating with a plunger compartment accommodating the plunger. The uppermost part of the upper through-hole is above or level with the uppermost part of the plunger compartment. The lowermost part of the lower through-hole is below or level with the lowermost part of the plunger compartment. The hydraulic control valve body has upper and lower vertical holes. The upper vertical hole is provided at a position above the upper through-hole provided in the cover of the solenoid in communication with the upper through-hole. The lower vertical hole is provided at a position below the lower through-hole provided in the cover of the solenoid in communication with the lower through-hole. The upper vertical hole is in communication with a tank port.

As stated above, the cover of the solenoid is provided with upper and lower through-holes extending through the cover to the plunger compartment. The uppermost part of the upper through-hole is above or level with the uppermost part of the plunger compartment. The lowermost part of the lower through-hole is below or level with the lowermost part of the plunger compartment. Thus, the air in the solenoid can be exhausted to the outside. Therefore, it is possible to stabilize the operation of the plunger of the solenoid and the operation of the spool of the hydraulic control valve.

Further, because wear particles generated in the solenoid are discharged through the lower through-hole, it is possible to prevent the plunger from sliding in wear particles, which would otherwise accelerate wear, and hence possible to improve durability.

When water is used as a working fluid for the hydraulic control valve, because the air in the solenoid is exhausted, it is possible to prevent oxidation of portions of constituent members that are in contact with water.

Because a vertical hole is provided in the hydraulic control valve body at a position above the upper through-hole in the cover of the solenoid in communication with the tank port, the air in the solenoid can be exhausted to the outside of the hydraulic control valve.

Because a vertical hole is provided in the hydraulic control valve body at a position below the lower through-hole in the cover of the solenoid, wear particles generated by the sliding movement of the plunger can be accumulated in the vertical hole. Moreover, there is no possibility that the wear particles accumulated in the vertical hole may be scattered or caused to flow backward by the operation of the hydraulic control valve.

EXPLANATION OF REFERENCE SYMBOLS

10: solenoid, 11: casing, 12: plunger, 13: bobbin, 14: excitation coil, 15: cover, 16: cover, 17: push pin, 18: non-magnetic cylindrical member, 19: magnetic cylindrical member, 20: compartment, 21: through-hole, 22: through-hole, 30: hydraulic control valve body, 31: hydrostatic bearing, 32: hydrostatic bearing, 33: spool, 35: sleeve, 36: spring, 37: pump port, 38: bearing orifice, 39: control port, 40: control port, 50: intermediate plate, 51: through-hole, 52: through-hole, 53: damping orifice, 54: horizontal hole, 55: vertical hole, 56: plug, 57: horizontal hole, 58: plug, 60: displacement sensor, 70: controller, 71: input terminal, P: reference position signal, Q: deviation signal, S: spool position signal.

BEST MODE FOR CARRYING OUT THE INVENTION

Figure 1:
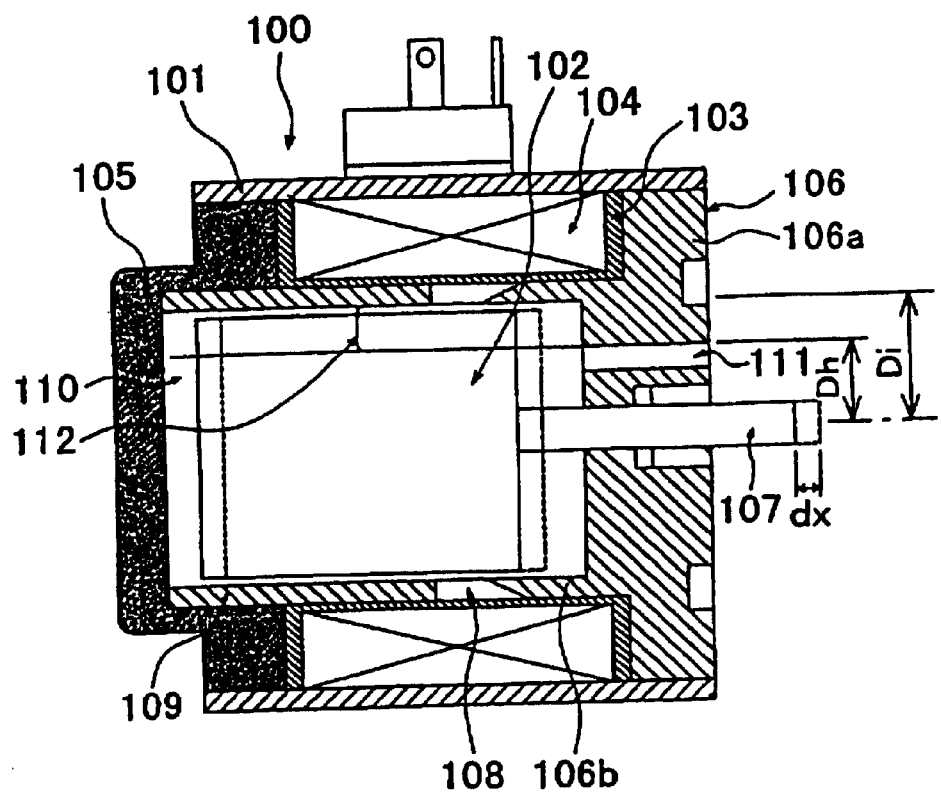
FIG. 1 is a sectional view showing a structural example of a conventional solenoid.
Figure 2:
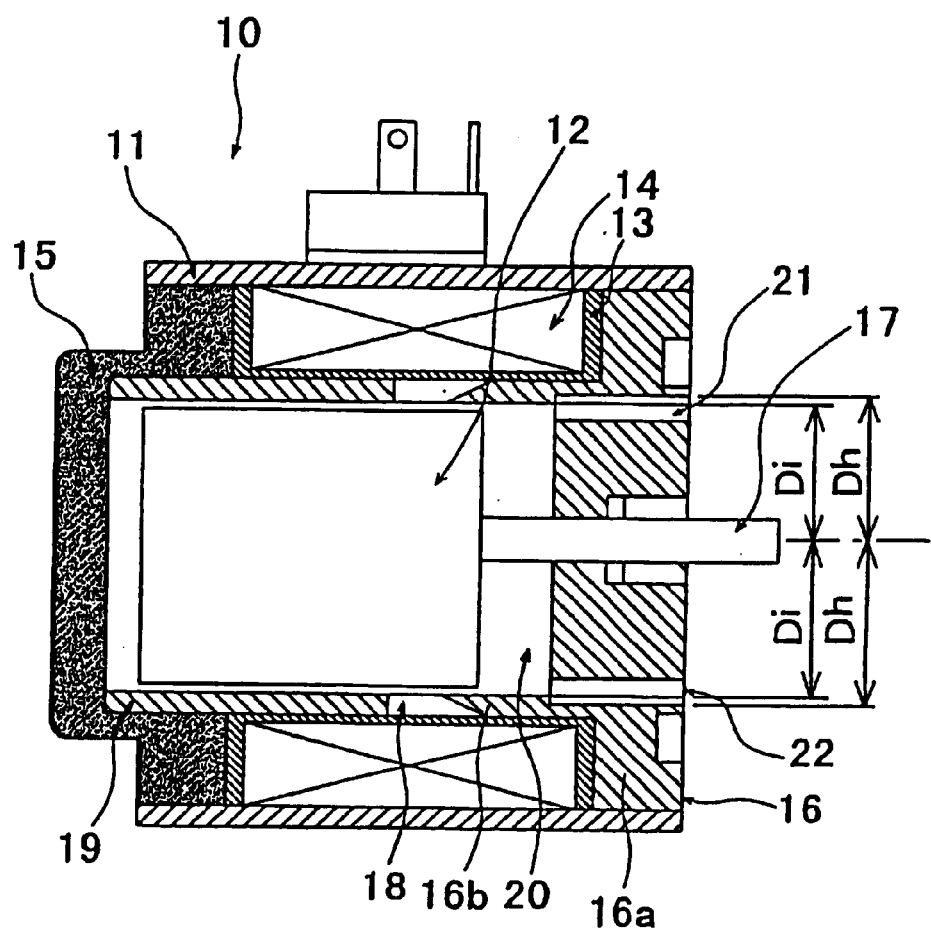
FIG. 2 is a sectional view showing a structural example of a solenoid according to the present invention.

Embodiments of the present invention will be described below on the basis of the drawings. FIG. 2 is a sectional view showing a structural example of a solenoid according to the present invention. This solenoid is also a solenoid that generates electromagnetic force proportional to the electric current supplied to an excitation coil in the same way as the conventional proportional solenoid shown in FIG. 1. The solenoid 10 has a cylindrical casing 11. An axially movable plunger 12 is placed in the casing 11, together with an excitation coil 14 wound around a bobbin 13. The excitation coil 14 is disposed to surround the outer periphery of the plunger 12. The sides of the casing 11 are covered with covers 15 and 16.

A push pin 17 projects through the center of the cover 16 to transmit force generated from the plunger 12 and the displacement thereof to the outside of the solenoid 10. The cover 16 has a disk-shaped cover portion 16a made of a magnetic material and a cylindrical portion 16b projecting from the cover portion 16a in such a manner as to surround a part of the outer periphery of the plunger 12. The cylindrical portion 16b has a tapered portion at the distal end thereof. The tapered portion is engaged with a tapered portion of a non-magnetic cylindrical member 18. A magnetic cylindrical member 19 is engaged with an end of the non-magnetic cylindrical member 18 on the side thereof remote from the cover 16. The cylindrical portion 16b of the cover 16, together with the non-magnetic cylindrical member 18 and the magnetic cylindrical member 19, surrounds the plunger 12.

The tapered portion of the cylindrical portion 16b and the tapered portion of the non-magnetic cylindrical member 18 allow a part of the axial magnetic flux produced from the excitation coil 14 to escape to the outer peripheral side, whereby the axial attraction force acting on the plunger 12 is kept constant independently of the position of the plunger. The above-described arrangement and the function of the solenoid 10 are the same as those of the conventional proportional solenoid.

The solenoid 10 has two through-holes 21 and 22 provided in the cover 16 at upper and lower positions, respectively. The through-holes 21 and 22 communicate with a cylindrical compartment 20 accommodating the plunger 12. The respective end surfaces of the through-holes 21 and 22 are located at positions remote from the axis of the compartment 20. More specifically, the distance Dh from the axis of the compartment 20 to the uppermost part of the upper through-hole 21 is set greater than the distance (the radius of the section of the compartment 20) Di from the axis to the uppermost part of the compartment 20. The distance Dh from the axis of the compartment 20 to the lowermost part of the lower through-hole 22 is set greater than the distance Di from the axis to the lowermost part of the compartment 20. It should be noted that the distance Dh and the distance Di may be set equal to each other (Dh=Di).

Providing the upper and lower through-holes 21 and 22 in the cover 16 as stated above allows the air remaining in the compartment 20 accommodating the plunger 12 to be exhausted to the outside of the solenoid 10 through the upper through-hole 21. Meanwhile, an amount of fluid corresponding to the amount of exhausted air is sucked into the solenoid 10 through the lower through-hole 22.

When the plunger 12 slides in the compartment 20, the outer surface of the plunger 12 and the inner peripheral surface of the compartment 20 rub against each other. If the use of the solenoid 10 is continued for a long period of time, wear particles are generated. The lower through-hole 22 performs the function of discharging the wear particles to the outside. If wear particles accumulate in the compartment 20 where the plunger 12 is accommodated, the plunger 12 slides in the wear particles. This accelerates the wear of the inner surface of the compartment 20. Therefore, by discharging the generated wear particles through the lower through-hole 22, it is possible to increase the usable life of the solenoid, that is, durability thereof.

Figure 3:
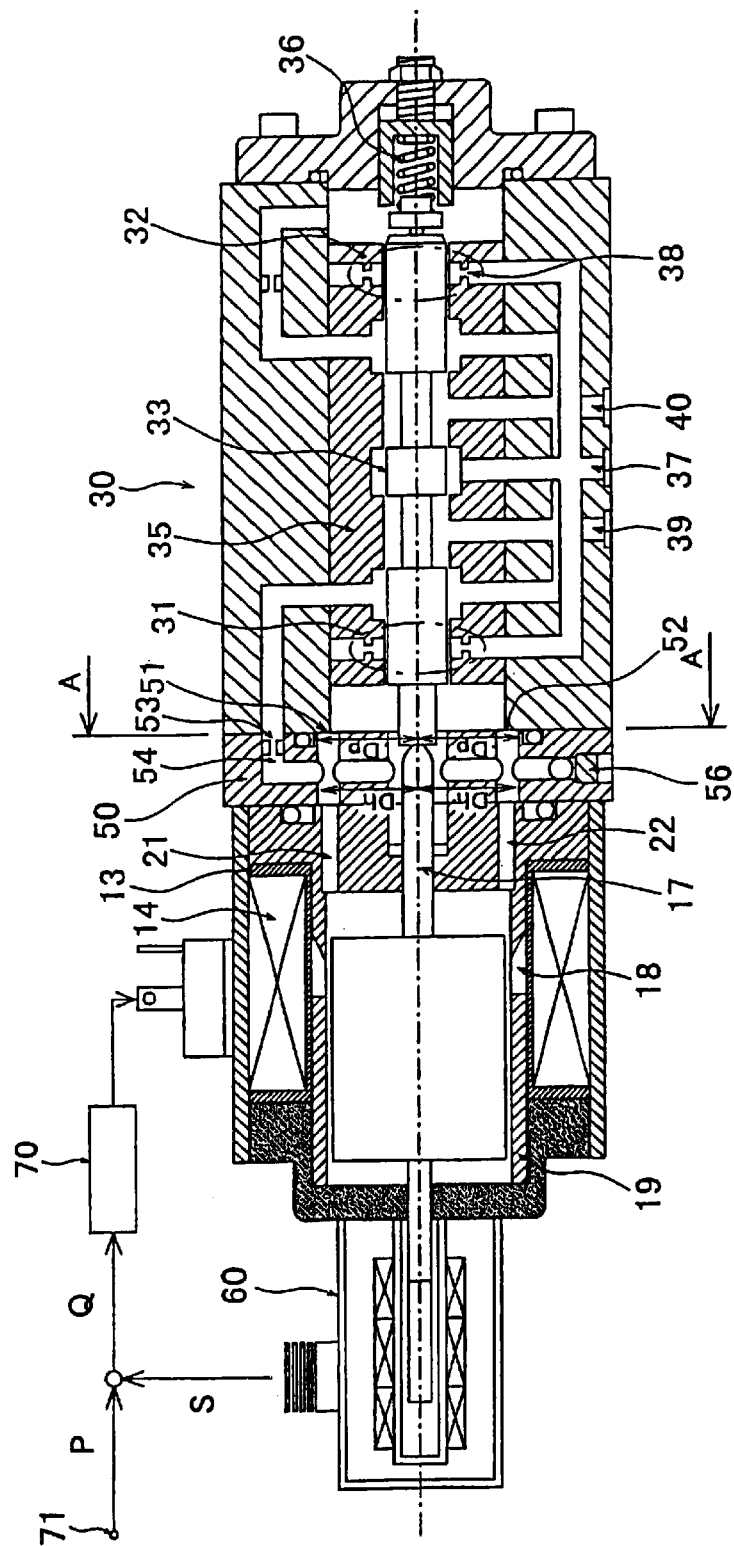
FIG. 3 is a sectional view showing a structural example of a hydraulic control valve according to the present invention.

Next, a hydraulic control valve according to the present invention that uses the solenoid 10 arranged as stated above will be described. FIG. 3 is a sectional view showing the arrangement of the hydraulic control valve according to the present invention. The hydraulic control valve has a structure in which a solenoid 10 is attached to a hydraulic control valve body 30 through an intermediate plate 50. It should be noted that reference numeral 60 denotes a displacement sensor.

As has been stated above, the solenoid 10 has two through-holes 21 and 22 provided in the cover 16 at upper and lower positions, respectively. The through-holes 21 and 22 communicate with the compartment 20 accommodating the plunger 12. The through-holes 21 and 22 are positioned so that the uppermost part of the through-hole 21 is above the compartment 20 and the lowermost part of the through-hole 22 is below the compartment 20. The intermediate plate 50 has through-holes 51 and 52 formed to extend therethrough at positions that are above and below the two through-holes 21 and 22, respectively, which are formed in the cover 16 of the solenoid 10. More specifically, the distance Dp from the axis to the uppermost part of the upper through-hole 51 is greater than the distance Dh from the axis to the uppermost part of the through-hole 21 in the solenoid 10 (Dp≧Dh), and the distance Dp from the axis to the lowermost part of the lower through-hole 52 is greater than the distance Dh from the axis to the lowermost part of the through-hole 22 in the solenoid 10 (Dp≧Dh).

The intermediate plate 50 is provided with a horizontal hole 54 at a position above the upper through-hole 51. The horizontal hole 54 has a damping orifice 53 and extends through the intermediate plate 50 as far as an intermediate position in the intermediate plate 50. In addition, the intermediate plate 50 is provided with a vertical hole 55 extending from the lower surface of the intermediate plate 50 to a depth where the vertical hole 55 communicates with the horizontal hole 54. The vertical hole 55 communicates with three holes formed in the intermediate plate 50, i.e. the through-holes 51 and 52 and the horizontal hole 54. The vertical hole 55 is sealed with a plug 56 or the like from below after being machined.

When air is present in the solenoid 10, the air is exhausted to the outside through the upper through-hole 21 provided in the solenoid 10. Then, the air flows into the vertical hole 55 through the through-hole 51 in the intermediate plate. Then, the air is discharged through the damping orifice 53 in the horizontal hole 54. Once the air has been discharged to the downstream side of the damping orifice 53, even if the air remains in the flow passage in the upper part of the hydraulic control valve body 30, it has no effect on the operation and function of the valve. In addition, the hydraulic control valve body 30 in this embodiment has hydrostatic bearings 31 and 32 provided at both ends of a spool 33. Therefore, such a flow is induced that the fluid at the left- and right-hand sides of the spool 33 is always removed and led to a tank port (not shown). Accordingly, the discharge of air is facilitated.

Wear particles generated by the sliding movement of the plunger 12 in the solenoid 10 are discharged to the outside through the lower through-hole 22 and enter the vertical hole 55 through the lower through-hole 52 in the intermediate plate 50. Because they have already entered the vertical hole 55, the wear particles accumulate in the bottom of the vertical hole 55 without being stirred or flowing backward even when the spool 33 operates or the fluid in the intermediate plate 50 moves.

Figure 4:
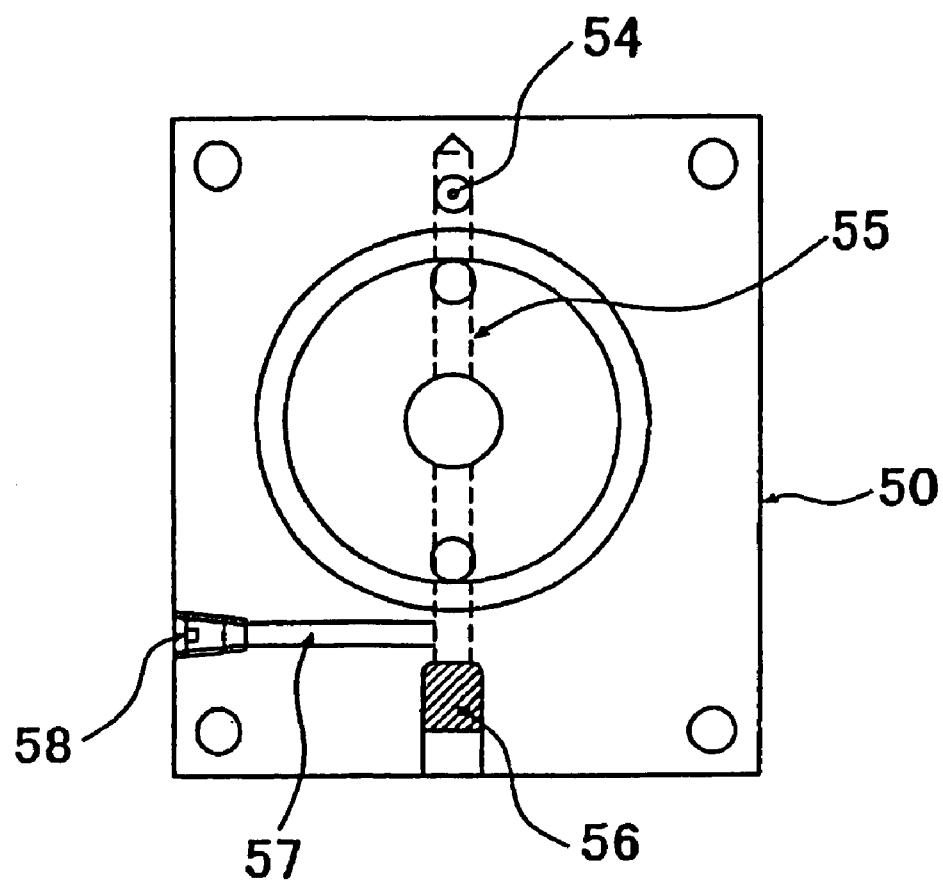
FIG. 4 is a view seen from the arrow A—A in FIG. 3.

FIG. 4 is a diagram showing a side of the intermediate plate 50, which is a view seen from the arrow A—A in FIG. 3. The amount of wear particles generated by the solenoid 10 is very small. Therefore, there will be no problem even if the wear particles accumulated in the vertical hole 55 are left as they are. However, the arrangement may be as shown in FIG. 4. That is, the intermediate plate is provided with a horizontal hole 57, and the horizontal hole 57 is sealed with a plug 58 or the like during use. When the valve is not in an operative state, the accumulated wear particles are discharged. Even if air enters the hydraulic control valve body 30 when the plug 58 is installed, the air is discharged from the vertical hole 55 above. By discharging wear particles to the outside of the solenoid 10 in this way, the durability of the solenoid 10 is improved markedly.

Next, the structure and operation of the hydraulic control valve arranged as stated above will be described. The hydraulic control valve body 30 has a sleeve 35 accommodated therein. A spool 33 is slidably inserted in the sleeve 35. A spring 36 generates force against the force for axially moving the spool 33 that is generated from the solenoid 10. The sleeve 35 is formed with a plurality of ports (a pump port 37, control ports 39 and 40, and a tank port) for switching between flow passages of the fluid supplied thereto. The spool 33 is displaced in either direction from a neutral position by sliding in the sleeve 35, thereby switching the flow passages from one to another (i.e. switched to the direction of pump port 37→control port 39 or to the direction of pump port 37→control port 40). By placing the spool 33 at a desired position in the sleeve 35, the opening of the flow passage (valve opening) can be changed continuously. It is also possible to control the flow rate or pressure continuously.

When a reference position of the spool 33 is entered from an input terminal 71, a deviation signal Q is produced from the reference position signal P and the actual spool position signal S fed back from the displacement sensor 60. The deviation signal Q is input to a controller 70 for the solenoid 10. The controller 70 amplifies the deviation signal directly and also integrates the deviation signal to supply the solenoid 10 with an excitation current balancing with the resilient force of the opposing spring 36, thereby placing the spool 33 at the reference position.

The hydraulic control valve has hydrostatic bearings 31 and 32 formed in the sleeve 35. A pressurized fluid is led to the hydrostatic bearings 31 and 32 from the pump port 37 and blown off toward the inner peripheral side through hydrostatic bearing orifices 38, thereby supporting the spool 33 out of contact with the sleeve 35. By providing such hydrostatic bearings 31 and 32, the spool 33 is allowed to slide smoothly in the sleeve 35 even if a fluid of low lubricating properties (e.g. water) is used as a working fluid.

It should be noted that the arrangement of the hydraulic control valve body 30 is merely an example. The arrangement of the hydraulic control valve body is not limited to the foregoing. Although in the above-described example the horizontal hole 54, the through-holes 51 and 52 and the vertical hole 55 are provided in the intermediate plate 50, these holes may be provided in the hydraulic control valve body 30.

EFFECT OF THE INVENTION

As has been described above, according to the features of the present invention, the following advantageous effects can be obtained.

According to the first feature of the present invention, the cover of the solenoid is provided with upper and lower through-holes extending through the cover to the plunger compartment. The uppermost part of the upper through-hole is above or level with the uppermost part of the plunger compartment. The lowermost part of the lower through-hole is below or level with the lowermost part of the plunger compartment. Thus, the air in the solenoid can be exhausted to the outside. Therefore, it is possible to provide a solenoid having a stabilized plunger operation.

Further, because wear particles generated in the solenoid are discharged to the outside through the lower through-hole, it is possible to prevent the plunger from sliding in wear particles, which would otherwise accelerate wear, and hence possible to improve durability. Further, when water is used as a working fluid for the hydraulic control valve, because the air in the solenoid is exhausted, it is possible to prevent oxidation of portions of constituent members that are in contact with water.

According to the second feature of the present invention, the above-described solenoid is attached to a hydraulic control valve body, and a vertical hole is provided in the hydraulic control valve body at a position above the upper through-hole in the cover of the solenoid. The vertical hole communicates with a tank port. Therefore, the air in the solenoid can be exhausted to the outside of the hydraulic control valve. Accordingly, the spool does not vibrate, and the operation of the hydraulic control valve is stabilized.

Further, because a vertical hole is provided in the hydraulic control valve body at a position below the lower through-hole in the cover of the solenoid, wear particles generated by the sliding movement of the plunger can be accumulated in the vertical hole. Moreover, there is no possibility that the wear particles accumulated in the vertical hole may be scattered or caused to flow backward by the operation of the hydraulic control valve.

What is claimed is:

1. A hydraulic control valve including a hydraulic control valve body having a spool sliding in a sleeve, and a solenoid having a plunger and an excitation coil for generating magnetic force to move the plunger, said solenoid being attached to the hydraulic control valve body to apply moving force to the spool by movement of the plunger, wherein a cover for a side of said solenoid at which said solenoid is attached to the hydraulic control valve body is provided with upper and lower through-holes communicating with a plunger compartment accommodating the plunger, wherein an uppermost part of the upper through-hole is above or level with an uppermost part of the plunger compartment, and a lowermost part of the lower through-hole is below or level with a lowermost part of the plunger compartment, and wherein said hydraulic control valve body has upper and lower vertical holes, said upper vertical hole being provided at a position above the upper through-hole provided in the cover of said solenoid in communication with said upper through-hole, said lower vertical hole being provided at a position below the lower through-hole provided in the cover of said solenoid in communication with said lower through-hole, and said upper vertical hole being in communication with a tank port so that air can be exhausted from the plunger compartment through said upper through-hole and vertical hole.

* * * * *